United States Patent
Wagner et al.

(10) Patent No.: US 12,088,586 B2
(45) Date of Patent: *Sep. 10, 2024

(54) BIOMETRIC VALIDATION PROCESS UTILIZING ACCESS DEVICE AND LOCATION DETERMINATION

(71) Applicant: Visa International Service Association, San Francisco, CA (US)

(72) Inventors: Kim R. Wagner, Sunnyvale, CA (US); Lacey Best-Rowden, San Mateo, CA (US); John F. Sheets, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/950,975

(22) Filed: Sep. 22, 2022

(65) Prior Publication Data

US 2023/0016784 A1 Jan. 19, 2023

Related U.S. Application Data

(63) Continuation of application No. 16/758,353, filed as application No. PCT/US2018/044322 on Jul. 30, 2018, now Pat. No. 11,496,467.

(Continued)

(51) Int. Cl.
*H04L 9/40* (2022.01)
*G06F 21/62* (2013.01)
(Continued)

(52) U.S. Cl.
CPC ...... *H04L 63/0861* (2013.01); *G06F 21/6245* (2013.01); *G06Q 20/1085* (2013.01);
(Continued)

(58) Field of Classification Search
CPC ............... H04L 63/0861; H04L 9/3231; H04L 9/008; H04L 2209/46; G06F 21/6245;
(Continued)

(56) References Cited

U.S. PATENT DOCUMENTS

2010/0214057 A1* 8/2010 Alvord ................... G01S 19/14
340/5.2
2013/0138567 A1 5/2013 Michelsen et al.
(Continued)

FOREIGN PATENT DOCUMENTS

GB 2554526 A 4/2018
WO 2013095434 A1 6/2013

OTHER PUBLICATIONS

Application No. PCT/US2018/044322, International Search Report and Written Opinion, Mailed On Oct. 31, 2018.

*Primary Examiner* — Mohammad W Reza
(74) *Attorney, Agent, or Firm* — Kilpatrick Townsend & Stockton LLP

(57) ABSTRACT

A first biometric sample of a user is received by an access device from a user device. First biometric information is generated in an obscured format, based on the first biometric sample. A plurality of biometric information is received in an obscured format. The plurality of biometric information corresponds to a plurality of users, and was obtained from biometric samples of the plurality of users. The first biometric information in the obscured format is compared to the plurality of biometric information in the obscured format, and a match result is generated based on the comparing. The match result is provided to a server computer. Based on the match result, information indicating that one of the plurality of users that is associated with one of the plurality of biometric information is the user associated with the first biometric information is received.

18 Claims, 6 Drawing Sheets

Related U.S. Application Data

(60) Provisional application No. 62/582,782, filed on Nov. 7, 2017.

(51) Int. Cl.
| | |
|---|---|
| *G06Q 20/10* | (2012.01) |
| *G06Q 20/32* | (2012.01) |
| *G06Q 20/40* | (2012.01) |
| *G07F 19/00* | (2006.01) |
| *H04L 9/00* | (2022.01) |
| *H04L 9/32* | (2006.01) |
| *H04W 12/06* | (2021.01) |
| *H04W 12/64* | (2021.01) |

(52) U.S. Cl.
CPC ... *G06Q 20/3224* (2013.01); *G06Q 20/40145* (2013.01); *G06Q 20/4016* (2013.01); *H04L 9/3231* (2013.01); *H04W 12/06* (2013.01); *H04W 12/64* (2021.01); *G06F 2221/2111* (2013.01); *G07F 19/206* (2013.01); *H04L 9/008* (2013.01); *H04L 2209/46* (2013.01)

(58) Field of Classification Search
CPC ........ G06F 2221/2111; G06Q 20/1085; G06Q 20/3224; G06Q 20/40145; G06Q 20/4016; G06Q 20/38215; H04W 12/06; H04W 12/64; G07F 19/206
See application file for complete search history.

(56) References Cited

U.S. PATENT DOCUMENTS

| | | | |
|---|---|---|---|
| 2014/0058865 A1 | 2/2014 | Yang et al. | |
| 2014/0081870 A1 | 3/2014 | de Sylva | |
| 2014/0201537 A1* | 7/2014 | Sampas | H04L 63/10 |
| | | | 713/186 |
| 2015/0120547 A1* | 4/2015 | Ghosh | G06Q 20/4012 |
| | | | 705/44 |
| 2015/0312041 A1* | 10/2015 | Choi | H04L 63/0861 |
| | | | 713/175 |
| 2016/0381013 A1* | 12/2016 | Buscemi | H04L 63/10 |
| | | | 726/4 |
| 2017/0039545 A1 | 2/2017 | Candelore et al. | |
| 2017/0264599 A1 | 9/2017 | O'Regan et al. | |
| 2018/0176216 A1* | 6/2018 | Mather | H04L 63/0823 |
| 2018/0330179 A1* | 11/2018 | Streit | G06F 18/2414 |
| 2019/0122221 A1* | 4/2019 | Douglas | G06Q 20/3224 |

* cited by examiner

BIOMETRIC VALIDATION PROCESS UTILIZING ACCESS DEVICE AND LOCATION DETERMINATION

CROSS-REFERENCE TO RELATED APPLICATIONS

This application is a continuation of U.S. patent application Ser. No. 16/758,353, filed Apr. 22, 2020, which is a 371 National Stage of International Application No. PCT/US2018/044322, filed Jul. 30, 2018, which claims the benefit of the filing date of U.S. Provisional Patent Application No. 62/582,782, filed Nov. 7, 2017. The disclosures of the above-named applications are incorporated by reference herein in their entireties.

BACKGROUND

Conventional systems for obtaining a resource such as cash at an access device such as an ATM (automatic teller machine) can be inconvenient For example, a typical transaction to obtain cash from an ATM may involve a user inserting a card into the ATM, waiting for a prompt for a PIN and instructions, inputting the PIN and instructions, and receiving the cash. Such processing uses a number of steps. In addition, the security of the conventional processes can also be improved.

Some systems may utilize biometric verification to authenticate a user when accessing a resource. In the above-described system, if a fingerprint reader is installed at the ATM machine, a user may provide a fingerprint to the ATM machine and the ATM machine may match the provided fingerprint to a stored fingerprint. Once the ATM machine matches the fingerprints, the user may have access to his or her cash.

Biometric systems such as these suffer from a number of drawbacks. For example, in the scenario above, the ATM or a computer in communication with the ATM would hold a user's enrollment biometric template, and would also receive the user's authentication biometric to do the comparison. Since the ATM may not be entirely trusted by the user and/or may be compromised in some way, the user's biometric data may not be entirely secure. Unauthorized access to a user's biometric data is more problematic than unauthorized access to secret data, since the latter can be changed by a user, but the former cannot. Further, the ATM or a computer in communication with the ATM may store thousands of biometric templates of various users. When a user wishes to access a resource using a biometric sample, the ATM or a computer in communication with the ATM may need to do a comparison to all of the thousands of stored biometric samples. This may take too long and may make the resource access process longer than conventional systems which may use secrets such as PINs or passwords.

Embodiments of the invention address these and other problems individually and collectively.

SUMMARY

Disclosed herein are a system and techniques directed to enabling biometric access to a resource managed by an access device. In some embodiments, a biometric template is stored in relation to a user device and/or account information. Upon receiving a request for access to a resource from an access device, the system may identify a number of user devices in proximity to the access device. Biometric templates associated with each of those user devices may be compared to a biometric template received from the access device. Upon identifying a match, the system may provide the access device with account information stored in relation to the matched biometric template. The access device may then complete a transaction using the provided account information and grant access to the requested resource.

One embodiment of the invention is directed to a method performed by a server computer including: receiving, from a user device operated by a user, a first biometric matching information of a user derived from a first biometric sample, storing the first biometric matching information along with a plurality of other biometric matching information received from other user devices, wherein the stored first biometric matching information and the plurality of other biometric matching information are obscured, detecting that the user device operated by the user is proximate to the access device, and in response to detecting that the user device is proximate to the access device, determining the match result using an obscured or unobscured second biometric matching information generated from a second biometric sample obtained by the access device, and the obscured first biometric matching information.

Another embodiment of the invention is directed to a server computer including: a processor; and a non-transitory computer-readable storage medium having code embodied thereon, the code being configured to cause the processor to: receive, from a user device operated by a user, a first biometric matching information of a user derived from a first biometric sample, store the first biometric matching information along with a plurality of other biometric matching information received from other user devices, wherein the stored first biometric matching information and the plurality of other biometric matching information are obscured, detect that the user device operated by the user is proximate to the access device, and in response to detecting that the user device is proximate to the access device, determine a match result using an obscured or unobscured second biometric matching information generated from a second biometric sample obtained by the access device, and the obscured first biometric matching information.

Further details regarding embodiments of the invention can be found in the Detailed Description and the Figures.

DETAILED DESCRIPTION

Figure 1:
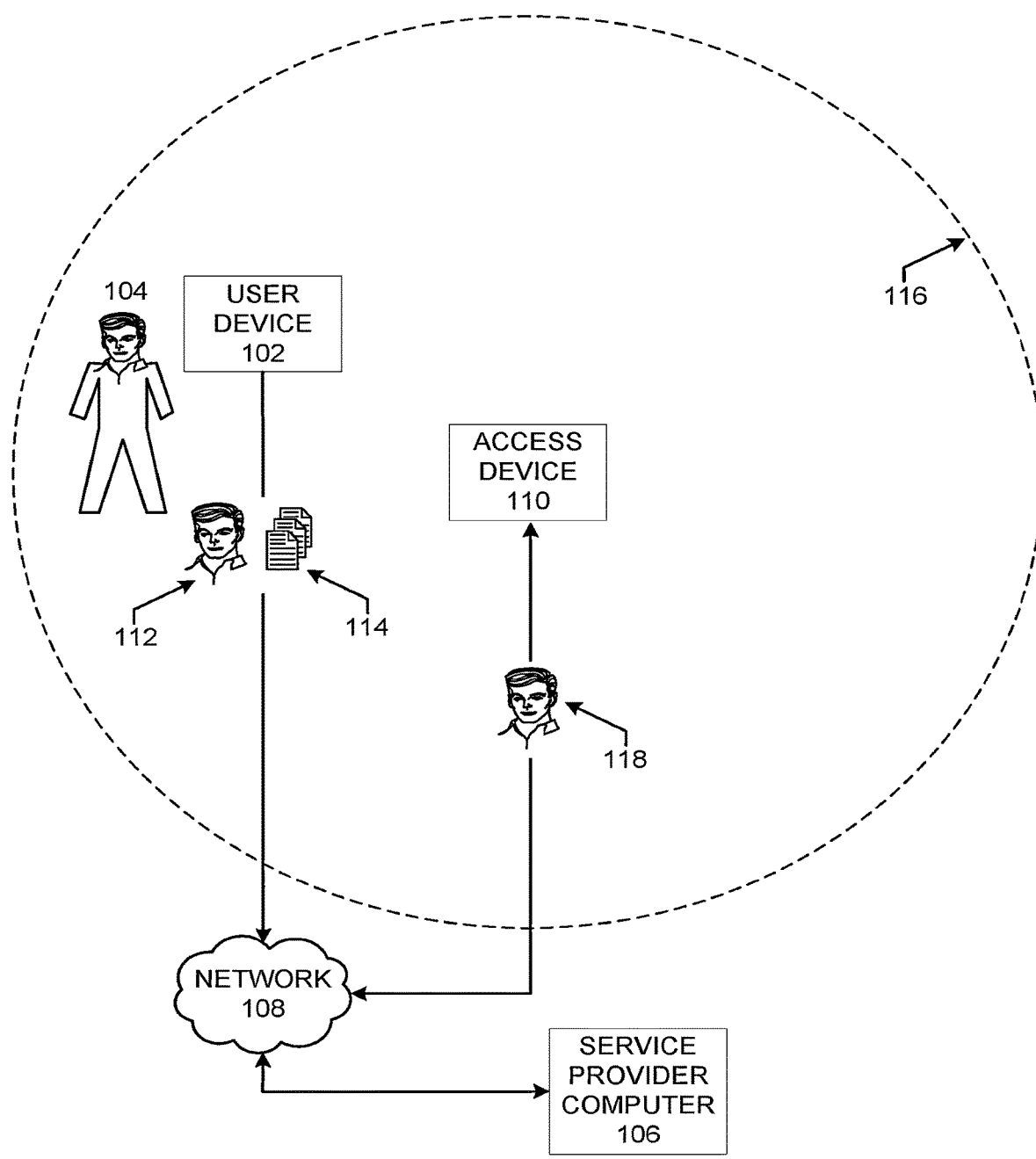
FIG. 1 depicts an illustration of an example system including a number of components according to at least some embodiments of the invention.

Prior to discussing embodiments of the invention, some terms can be described in further detail.

An "access device" may be any suitable device that provides access to a resource. An access device may also be used for communicating with a transport computer, a communication network, or any other suitable system. An access device may generally be located in any suitable location, such as at the location of a merchant. An access device may be in any suitable form. Some examples of access devices include POS or point of sale devices (e.g., POS terminals), cellular phones, personal digital assistants (PDAs), personal computers (PCs), tablet PCs, hand-held specialized readers, set-top boxes, electronic cash registers (ECRs), vending machines, automated teller machines (ATMs), virtual cash registers (VCRs), kiosks, security systems, access systems, and the like. An access device may use any suitable contact or contactless mode of operation to send or receive data from, or associated with, a mobile communication or payment device. For example, access devices can have card readers that can include electrical contacts, radio frequency (RF) antennas, optical scanners, bar code readers, or magnetic stripe readers to interact with portable devices such as payment cards.

An "application" may be a computer program that is used for a specific purpose.

"Authentication" may include a process for verifying an identity of something (e.g., a user). One form of authentication can be biometric authentication.

A "biometric" may be any human characteristic that is unique to an individual. For example, a biometric may be a person's fingerprint, voice sample, face, DNA, retina, etc.

A "biometric authentication template" is intended to refer to a biometric template that was generated from biometric data (e.g., biometric sample(s)) provided during an authentication process conducted with an access device.

A "biometric enrollment template" is intended to refer to a biometric template that was generated from biometric data (e.g., biometric sample(s)) provided during an enrollment process conducted with a user device (or at least prior to initiation of an authentication process).

A "biometrics interface" may be an interface across which biometrics information is captured. Biometrics interfaces include a thumb print scanner, an iris or retina scanner, a camera, a microphone, a breathalyzer, etc. Biometrics interfaces may be present on user devices, such as mobile devices, or present at an access terminal.

A "biometric reader" may include a device for capturing data from an individual's biometric sample. Examples of biometric readers may include fingerprint readers, front-facing cameras, microphones, and iris scanners.

A "biometric sample" or "biometric information" may include biometric data obtained by any type of input sensor. The data may be either an analog or digital representation of the user's biometric attributes, generated prior to determining distinct features needed for matching. For example, a biometric sample of a user's face may be image and/or depth data. In another example, a biometric sample of a user's voice may be audio data.

A "biometric template" or "biometric sample template" may include a file containing distinct characteristics extracted from a biometric sample that may be used during a biometric authentication process. For example, a biometric template may be a binary mathematical file representing the unique features of an individual's fingerprint, eye, hand or voice needed for performing accurate authentication of the individual. A biometric template may be an example of biometric matching information.

"Biometric matching information" may include any suitable information used to perform a biometric authentication process. In some embodiments, biometric matching information may include a biometric template such as a biometric enrollment template generated during an enrollment process and/or an obfuscated matching circuit configured to provide an output from which a match between two biometric templates is identifiable. Other types of biometric matching information may include encrypted or otherwise obfuscated biometric data.

A "camera device" may include any number of different types of devices for collecting imagery. A single device may include a number of camera devices, one or more of which may be a range camera device (e.g., a depth sensor) capable of generating a range image, and another of which may be a camera configured to capture image information. A range camera (e.g., a depth sensor) may be any device configured to identify a distance or range of an object or objects. In some embodiments, the range camera may generate a range image, in which pixel values correspond to the detected distance for that pixel. The pixel values can be obtained directly in physical units (e.g., meters). In at least some embodiments of the disclosure, the system may employ a range camera that operates using structured light. In a range camera that operates using structured light, a projector projects light onto an object or objects in a structured pattern. The light may be of a range that is outside of the visible range (e.g., infrared or ultraviolet). The range camera may be equipped with one or more camera devices configured to obtain an image of the object with the reflected pattern. Distance information may then be generated based on distortions in the detected pattern. It should be noted that although this disclosure focuses on the use of a range camera using structured light, any suitable type of range camera, including those that operate using stereo triangulation, sheet of light triangulation, time-of-flight, interferometry, coded aperture, or any other suitable technique for range detection, would be useable by the described system. Camera devices may be used to obtain biometric sample from a user. For example, the camera device may be used to collect an image and/or range map of a user's face.

The term "ciphertext" may refer to text that is that is in an encrypted form. For example, this could refer to text which must be decrypted before it can be understood by a human or computer. Ciphertext may be generated by any number of cryptographic algorithms, such as RSA or AES.

A "computing device" may be any suitable device that can receive and process data. Examples of computing devices may include access devices, transport computers, processing network computers, or authorization computers.

The term "cryptographic key" may refer to something used in encryption or decryption. As an example, a cryptographic key could refer to a product of two large prime numbers. a cryptographic key may serve as an input in a cryptographic process, such as RSA or AES, and may be used to encrypt plaintext and produce a ciphertext output, or decrypt ciphertext and produce a plaintext output.

The term "fuzzy extraction" may refer to a cryptographic technique to convert biometric data into a random string. Cryptographic techniques may then be applied to the random string in order to encrypt and authenticate biometric records. As described herein, "a fuzzy extractor" may correspond to a cryptographic comparison protocol used to generate cryptographic keys from biometric templates in a way that if the mechanism generates a particular cryptographic key from a first biometric template, the mechanism will generate an identical cryptographic key from a second biometric template so long as the second biometric template matches (i.e., is not necessarily identical to, but close enough to) the first biometric template. Cryptographic keys generated by a fuzzy extractor from two biometric templates may be compared to verify that two biometric templates match (e.g., are identical or at least similar over some threshold degree).

In some embodiments, a fuzzy extractor includes two functions: a first fuzzy extractor function G and a second fuzzy extractor function R. G may take a biometric template W_D and map it to a pair of value (R_D, S_D), where R_D is a secret cryptographic key and S_D is a public value that is needed for recreating R_D from any biometric template W_D' that matches W_D. R take W_D' and S_D and maps them to a secret cryptographic key R_D', where R_D' is equal to R_D if W_D' matches W. Stated another way, the fuzzy extractor function G is used to generate a secret cryptographic key and a public value from a first biometric template while the second fuzzy extractor function R can re-generate the same secret cryptographic key from the same public value and a second biometric template as long as the first and second biometric templates match. Further details on fuzzy extractors can be found in an article entitle "Fuzzy Extractors; How to Generate Strong Keys from Biometric and Other Noisy Data," by Yegeniy Dodis, et al. SIAM Journal on Computing, 38(1):97-139, 2008. This reference is herein incorporated by reference in its entirety for all purposes.

"Homomorphic encryption" is intended to refer to a form of encryption that allows computation on ciphertexts, generating an encrypted result which, when decrypted, matches the result of the operations as if they had been performed on the plaintext. Thus, two encrypted biometric templates may be used to generate an encrypted result, that when decrypted, matches the result of the operations as if they had been performed on unencrypted biometric templates. Accordingly, encrypted results may be passed between devices and/or software applications and a receiving device may decrypt the encrypted result and use the encrypted and/or decrypted result for match verification purposes.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "memory" may be any suitable device or devices that can store electronic data. A suitable memory may include a non-transitory computer readable medium that stores instructions that can be executed by a processor to implement a desired method. Examples of memories may include one or more memory chips, disk drives, etc. Such memories may operate using any suitable electrical, optical, and/or magnetic mode of operation.

The term "plaintext" may refer to text that is in a plain form. For example, plaintext could refer to text which a human or a computer could read without any processing, such as the phrase "hello, how are you?" It may also refer to text which is in an unencrypted form. Numbers or other symbols may also qualify as plaintext.

A "private key" may include any encryption key that may be protected and secure. For example, the private key may be securely stored at an entity that generates a public/private key pair and may be used to decrypt any information that has been encrypted with the associated public key of the public/private key pair.

A "processor" may refer to any suitable data computation device or devices. A processor may include one or more microprocessors working together to accomplish a desired function. The processor may include a CPU including at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "public/private key pair" may include a pair of linked cryptographic keys generated by an entity. The public key may be used for public functions such as encrypting a message to send to the entity or for verifying a digital signature which was supposedly made by the entity. The private key, on the other hand may be used for private functions such as decrypting a received message or applying a digital signature. The public key will usually be authorized by a body known as a certification authority (i.e., certificate authority) which stores the public key in a database and distributes it to any other entity which requests it. The private key will typically be kept in a secure storage medium and will usually only be known to the entity. However, the cryptographic systems described herein may feature key recovery mechanisms for recovering lost keys and avoiding data loss.

A "public key" may include any encryption key that may be shared openly and publicly. The public key may be designed to be shared and may be configured such that any information encrypted with the public key may only be decrypted using a private key associated with the public key (i.e., a public/private key pair).

"Secure Multi-Party Computation (SMPC)" is used herein to refer an encryption mechanism that utilizes cryptographic techniques in order to enable multiple entities to jointly compute a function while keeping their inputs into the function private. Thus, in some embodiments discussed herein, two applications and/or systems may utilize two corresponding obfuscated biometric templates to jointly compute a function. This function (and/or function output) may then be used to verify that the encrypted biometric templates at each application/system match (or substantially match) while simultaneously enabling the biometric templates to remain private, or in other words, without having to exchange the biometric templates between the applications/systems.

For example, a first computing module (e.g., a device, an application) may determine an authentication function. The authentication function may implement a matching algorithm that can be configured to compare two templates (e.g., a biometric enrollment template and a biometric authentication template) and output an authentication result (e.g., match/no match, 90% likelihood of match, etc.) based on the comparison. In some embodiments, the authentication function may be transformed from a function F that takes two inputs to a function G that takes one input. The first computing module may then determine a circuit representing the function G. The first computing module may obfuscate the circuit by assigning one or more random values to each of the wires of the circuit. The first computing module may the send information associated with the obfuscated circuit to a second computing module (e.g., a different device or application). In some embodiments, the information may include obfuscated values associated with each logic gate in the obfuscated circuit, as well as information indicating how the logic gates in the obfuscated circuit are connected to each other.

The second computing module can evaluate the obfuscated circuit utilizing a second biometric template (e.g., a biometric authentication template) as input. In some embodiments, the biometric template may be obfuscated prior to being utilized as input for the obfuscated circuit. In some embodiments, the second computing module may send a request to the first computing module to translate the biometric authentication template into an obfuscated authentication template. This may cause the first computing module to initiate an oblivious transfer protocol. The oblivious transfer protocol may enable the first computing module to send the obfuscated authentication template in parts that are then received by the second computing module. Using the obfuscated authentication template, the second computing module may evaluate the obfuscated circuit to determine an obfuscated authentication result. The authentication result may be provided back to the first computing module. The transfer here is secure because an intermediary would not be able to derive any meaningful information based on intercepting the obfuscated authentication result. The first computing module may be configured to determine whether the user is authenticated based on the obfuscated result. By way of example, the first computing module may utilize stored mappings between obfuscated values a non-obfuscated values corresponding to wires of the obfuscated circuit. Based on the mapping(s), the non-obfuscated values associated with obfuscated values included in the obfuscated authentication result may be determined. The first computing module may determine the authentication result based on the determined non-obfuscated values.

A "server computer" may include a powerful computer or cluster of computers. For example, the server computer can be a large mainframe, a minicomputer cluster, or a group of servers functioning as a unit. In one example, the server computer may be a database server coupled to a Web server. A server computer may be coupled to a database and may include any hardware, software, other logic, or combination of the preceding for servicing the requests from one or more client computers. A server computer may include one or more computational apparatuses and may use any of a variety of computing structures, arrangements, and compilations for servicing the requests from one or more client computers.

A "service provider computer" may be a computer that provides a service to a user. Examples of service provider computers may include access devices such as POS terminals, processor computers operated by payment processing networks, issuer computers, computers that allow access to sensitive data, access terminals allowing access to sensitive locations, transmitting stations such as Bluetooth transmitting stations, computers that allow users to obtain certain services, etc.

A "user" may include an individual. In some embodiments, a user may be associated with one or more personal accounts and/or user devices.

A "user device" may be any suitable device that can interact with a user (e.g., a payment card or mobile phone). A user device may communicate with or may be at least a part of an access device or a server computer. User devices may be in any suitable form. Some examples of user devices include POS devices, cellular phones, PDAs, personal computers (PCs), tablet PCs, wearable devices (e.g., smart watches), vehicles with communication capabilities (e.g., smart cars), etc.

The term "validation" may include the act of checking or affirming that information is legitimate. An example may be the act of checking that a digital signature appended to an electronic record is, in fact, legitimate and was signed by the entity that alleges creation of the digital signature. In some embodiments, digital signatures may be validated according to a verification algorithm in conjunction with a signing entity's public key. In other cases, if underlying data was signed using a symmetric key of a symmetric key pair, the signature can be validated with the corresponding symmetric key.

FIG. 1 depicts an illustration of an example system including a number of components according to at least some embodiments of the invention. Depicted in system 100 is a user device 102 operated by a user 104 as well as a service provider computer 106. Communication may occur between various components of the system 100 via a network 108. An access devices 110 is also shown in communication with the service provider computer 106 via the network 108. In some embodiments, the access device 110 may be used by the user 104 to complete a transaction (e.g., to obtain cash).

As depicted, the system may include a user device 102. The user device 102 may be any electronic device capable of communicating with a service computer 106 and/or an access device 110. In some embodiments, the user device 102 may be a mobile device (e.g., a smart phone). In some embodiments, biometric information for (e.g., an image of) the user 104 may be captured using a camera of the user device 102 and transmitted to a service provider computer 106 for processing. In some embodiments, at least a portion of the functionality described herein may be executed via a mobile application installed upon the user device 102. The user device 102 may be configured to obtain a biometric sample from the user 104, which may then be used to enroll the user 104 in the described system. In some embodiments, the user device 102 may obtain the biometric sample from the user and generate a biometric template 112 from that biometric sample. The biometric template 112 may then be encrypted (e.g., using an encryption key specific to the user device 102) and transmitted to the service provider computer 106. In some embodiments, the user device 102 may also provide account information 114 to the service provider computer 106. For example, the user 104 may be asked to select, or provide, at least one primary account number (PAN) to be linked to the functionality described herein. In this example, the PAN may be provided to the service provider computer 106. It should be noted that in some embodiments, account information may be provided to the service provider computer 106 through a separate channel (i.e., by a device other than the user device 102).

As depicted, the system may include a service provider computer 106. The service computer 106 may be any computing device capable of performing at least a portion of the functionality described herein. In some embodiments, the service provider computer 106 may receive biometric information from the user device 102 and may store that biometric information in relation to one or more accounts. The service provider computer 106 may be further configured to monitor a geographic location for the user device 102 (e.g., via global positioning system (GPS) coordinates obtained by the user device 102). Upon receiving a request to complete a transaction from an access device 110, the service provider computer 106 may identify each user device 102 within some predetermined distance 116 of the access device 110. The request received from the access device 110 may include a biometric template generated by the access device 110 for a user 104 that wishes to complete a transaction. The service provider computer 106 may then be configured to compare the biometric template received from the access device 110 to biometric templates stored in a database in relation to each user device determined to be within the predetermined distance 116 of the requesting access device 110. The biometric templates that are in the database may be encrypted, such that they protected from any potential data breaches.

The network 108 may be any suitable communication network or combination of networks. Suitable communications networks may include any one or a combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); Hyper-Text Transfer Protocol (HTTP); Secure Hypertext Transfer Protocol (HTTPS), Secure Socket Layer (SSL), ISO (e.g., ISO 8583) and/or the like.

An access device 110 may be configured to manage access to a particular resource. Upon receiving a request from a user 104 to access that resource, the access device 110 may be configured to obtain a biometric sample from that user 104. The access device 110 may then generate a second biometric template 118 (e.g., an authentication template) using a process substantially similar to the process used by the user device 102 to generate the biometric template 112. In some embodiments, the biometric template 118 or an encrypted version of the biometric template 118 may then be transmitted to the service provider computer 106 for authentication. In some embodiments, the service provider computer 106 may provide a number of encrypted biometric templates to the access device 110 and the access device 110 may compare the encrypted biometric template 118 that it generated to each of the encrypted biometric templates provided to it by the service provider 106. In these embodiments, it should be noted that the encrypted biometric templates need not be decrypted by the access device 110 to make the comparison. For example, the encrypted biometric templates may have been encrypted using homomorphic encryption techniques, enabling the access device 110 to make a comparison between the encrypted biometric templates without having access to plaintext data within the encrypted biometric templates. The resulting comparison (an encrypted match result) may be provided to, and decrypted and processed by, the service provider computer 106. The access device 110 may receive a response from the service provider computer 106 that includes an indication of a particular account associated with the user 104. The access device 110 may then complete the transaction in a manner similar to conventional manners using the account information provided by the service provider 106.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications protocol.

Figure 2:
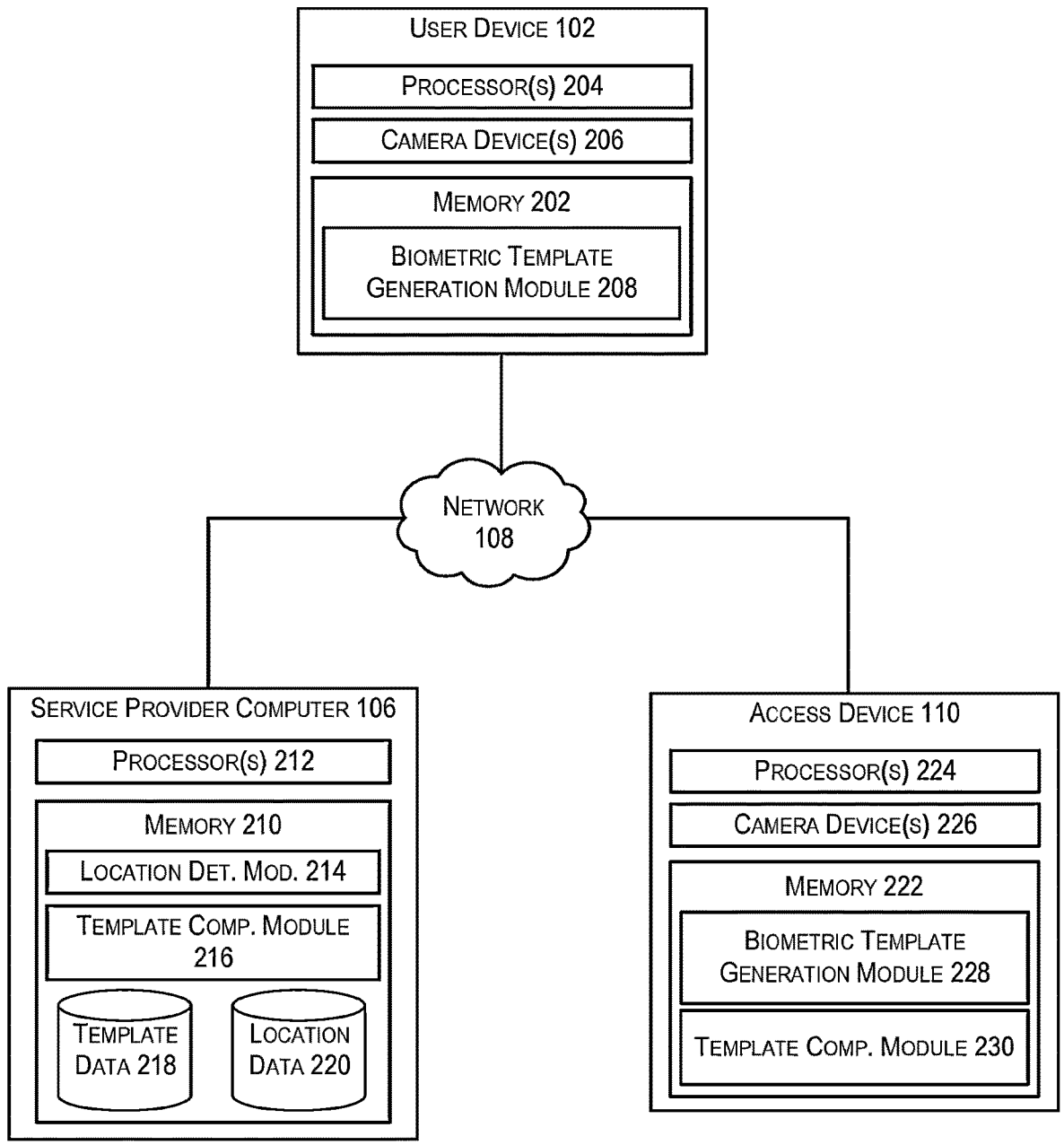
FIG. 2 depicts an illustrative example of a system or architecture in which techniques for providing access to resources in an account using biometric information may be implemented.

FIG. 2 depicts an illustrative example of a system or architecture 200 in which techniques for providing access to resources in an account using biometric information may be implemented. In architecture 200, one or more consumers and/or users may utilize a user device 102. In some examples, the user device 102 may be in communication with a service provider computer 106 and/or an access device 110 via a network 108, or via other network connections. User device 102, service provider computer 106, network 108, and access device 110 may be examples of the respective components depicted in FIG. 1.

The user device 102 may be any type of computing device such as, but not limited to, a mobile phone, a smart phone, a personal digital assistant (PDA), a laptop computer, a desktop computer, a server computer, a thin-client device, a tablet PC, etc. The user device 102 may include a memory 202 and one or more processors 204 capable of processing user input. The user device 102 may also include one or more input sensors, such as camera devices 206, for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. In some embodiments, camera devices 206 may include a number of different types of camera devices, one or more of which may be a range camera device (e.g., a depth sensor) capable of generating a range image, and another of which may be a camera configured to capture image information. Accordingly, biometric information obtained via a camera device may include image information and/or depth information (e.g., a range map of a face).

Embodiments of the application on the user device 102 may be stored and executed from its memory 202. The memory 202 may store program instructions that are loadable and executable on the processor(s) 204, as well as data generated during the execution of these programs. Depending on the configuration and type of user device 102, the memory 202 may be volatile (such as random access memory (RAM)) and/or non-volatile (such as read-only memory (ROM), flash memory, etc.). The user device 102 may also include additional storage, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 202 may include multiple different types of memory, such as static random access memory (SRAM), dynamic random access memory (DRAM) or ROM. Turning to the contents of the memory 202 in more detail, the memory 202 may include an operating system and one or more application programs or services for implementing the features disclosed herein including at least a module for generating a biometric template from a biometric sample (biometric template generation module 208). The memory 202 may also include instructions that cause the user device 102 to encrypt any generated biometric template.

In some embodiments, the biometric template generation module 208 may include code that, when executed in conjunction with the processors 204, cause the user device 102 to obtain a biometric sample from a user and generate a biometric template from that biometric sample. In some embodiments, a biometric template may be a binary mathematical file representing the unique features of an individual's fingerprint, eye, hand or voice needed for performing accurate authentication of the individual. A biometric template may be generated in any suitable manner. For example, the biometric template may store an indication of a relationship between various biometric features for a user which are derived from the biometric sample. By way of illustrative example, a biometric template may store an indication of a user's eye location with respect to that user's nose. It should be noted that whereas a full biometric sample may require a large amount of memory to store, a biometric template derived from a biometric sample that stores an indication of relationships between features found in the sample may require significantly less memory for storage.

The memory 202 and any additional storage, both removable and non-removable, are examples of non-transitory computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the user device 102 or the service provider computer 106. The user device 102 may also contain communications connections that allow the user device 102 to communicate with a stored database, another computing device or server, user terminals, and/or other devices on the network 208. The user device 102 may also include input/output (I/O) device(s) and/or ports, such as for enabling connection with a keyboard, a mouse, a pen, a voice input device, a touch input device, a display, speakers, a printer, etc.

The user device 102 may also include a location determination device such as a GPS location device or any other device that can allow for the determination of the location of the user device 102.

In some examples, the network 208 may include any one or a combination of many different types of networks, such as cable networks, the Internet, wireless networks, cellular networks, and other private and/or public networks. It is noted that the described techniques may apply in other client/server arrangements (e.g., set-top boxes, etc.), as well as in non-client/server arrangements (e.g., locally stored applications, peer to-peer systems, etc.).

The service provider computer 106 and/or access device 110 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, one or both of the depicted computing devices may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the service provider computer 106 may include at least one memory 210 and one or more processing units (or processors) 212. The processor(s) 212 may be implemented as appropriate in hardware, computer-executable instructions, firmware or combinations thereof. Computer-executable instruction or firmware implementations of the processor(s) 212 may include computer-executable or machine executable instructions written in any suitable programming language to perform the various functions described.

Turning to the contents of the memory 210 in more detail, the memory 210 may include a location detection module 214 that, when used in conjunction with the processor(s) 212, is configured to determine a current location of one or more user devices 102. In some embodiments, the service provider computer 106 may receive current location data (e.g., the latitude and longitude) from each user device 102 with which it is in communication either continuously or on a periodic basis. For example device location data may be provided to the service provider computer 106 via a mobile application installed on the user device 102. Upon receiving a request to access a resource that includes a biometric template generated by an access device 110, the location detection module 214 may be configured to identify all user devices 102 within proximity (i.e., closer than some predetermined distance, such less than 5, 10, or 20 feet) of the access device 110 from which the request was received.

The memory 210 may include a template comparison module 214 that, when used in conjunction with the processor(s) 212, is configured to compare an authentication template (e.g., a biometric template provided by an access device 110 via a request for access to a resource) to biometric templates associated with each user device in proximity of the access device 110. In some embodiments, the template comparison module 214 may be configured to identify a closest-match from all of the biometric templates associated with user devices 102 in proximity of the access device 110. In some embodiments, the template comparison module 214 may first filter out unlikely candidate user device biometric templates (e.g., based on demographic information or other suitable factors) before comparing the received biometric template to the remaining user device biometric templates. For example, if the access device indicates that the user requesting access is female, then the template comparison module 214 may be configured to only compare the biometric template received from the access device 110 to biometric templates associated with female users. Upon identifying a closest-match, the template comparison module 214 may be configured to determine a likelihood (based on a degree to which the biometric templates match) that the user requesting access via the access device is the same user that operates the user device 102. In some embodiments, the service provider computer 106 may determine whether the likelihood of the user requesting access being the same user that operates the user device 102 exceeds some predetermined threshold, where the predetermined threshold represents some acceptable level of risk value. The template comparison module 214 may be configured to provide, in response to the received request, an indication of the closest matching user to the access device 110 as well as account information to be used in completing the requested transaction. In some embodiments, the template comparison module 214 may be configured to provide an indication as to whether or not the transaction should be approved or declined based on the likelihood value determined by the template comparison module 214. In some embodiments, the template comparison module 214 may be configured to provide the likelihood value to the access device 110 so that the access device 110 may determine whether to approve or decline the transaction based on its own acceptable level of risk value.

In some embodiments, the template comparison module 216 may include code, executable by the processor(s) 212 for performing privacy preserving comparison protocol such as secure multi-party computation, homomorphic encryption, or fuzzy extractor techniques. Note, that such processes can be performed without decrypting the enrollment templates if the enrollment templates are stored in a database.

Additionally, the memory 210 may include template data 218, which stored biometric templates received from one or more user devices 102. In some embodiments, the biometric templates are obscured. The biometric templates may be obscured in any suitable manner. For example, the biometric templates may be encrypted. In other embodiments, the biometric templates may in the form of an obfuscated circuit if a secure multi-party computation process is used in the biometric comparison process (as described in PCT application number PCT/US17/24099, entitled AUTHENTICATION SYSTEM USING SECURE MULTI-PARTY COMPUTATION, filed on Mar. 24, 2017 and herein incorporated by reference in its entirety). This helps preserve privacy, and protects against data breaches by unauthorized persons. The biometric templates stored in template data 218 may be associated with an account (e.g., a payment account). The memory may also include location data 220, which may store location information for one or more access devices 110 as well as current location information for one or more user devices 102. template data 218 and/or location data 220 may be stored in one or more databases.

The access device 110 may be any suitable type of computing device that manages access to a resource. The access device 110 may include a memory 222 and one or more processors 224 capable of processing user input. The access device 110 may also include one or more input sensors, such as camera devices 226, for receiving user input. Embodiments of the application on the access device 110 may be stored and executed from its memory 222. The memory 222 may store program instructions that are loadable and executable on the processor(s) 224, as well as data generated during the execution of these programs. The memory 222 may include an operating system and one or more application programs or services for implementing the features disclosed herein including at least a module for generating a biometric template from a biometric sample (biometric template generation module 228) and/or a module for generating an encrypted match result by comparing two encrypted biometric templates (template comparison module 230). The biometric template generation module 228 may be substantially similar to the biometric template generation module 208 described above. The memory 222 may also include instructions that cause the access device 110 to encrypt any generated biometric template before providing that biometric template to the service provider 106.

In some embodiments, the access device 110 may include a template comparison module 230. Upon receiving a request to conduct a transaction using biometric data, the access device 110 may convey the request to the service provider computer 106, which may subsequently provide encrypted biometric templates associated with each of the user devices determined to be proximate to the access device 110. The template comparison module 230 of the access device 110 may then perform a comparison between the encrypted biometric template generated via the biometric template generation module 228 and each of the encrypted biometric templates provided by the service provider computer 106 to identify a closest match. In these embodiments, it should be noted that the encrypted biometric templates need not be decrypted to make the comparison. For example, the encrypted biometric templates may have been encrypted using homomorphic encryption techniques, enabling the template comparison module 230 to make a comparison between the encrypted biometric templates without decrypting those encrypted biometric templates. The resulting match result data file will be inherently encrypted and can be decrypted using the same decryption key that could be used to decrypt each of the encrypted biometric templates. In these embodiments, the encrypted match result (which results from the comparison between two encrypted biometric templates) may be provided to the service provider computer 106. The service provider computer 106 may then provide an indication as to a likelihood that the two encrypted biometric templates are a match.

Figure 3:
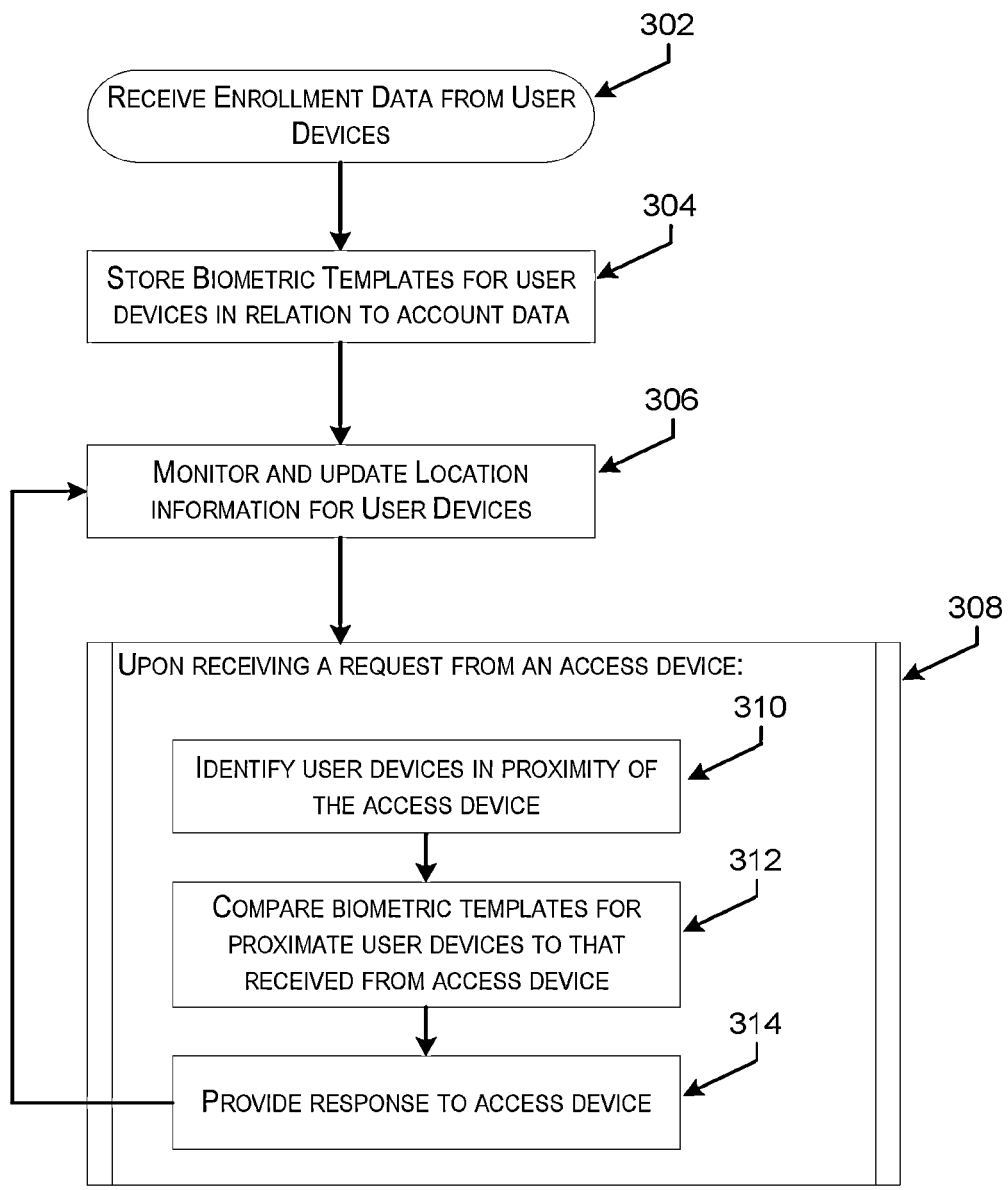
FIG. 3 depicts a flow chart illustrating an example process for enabling biometric access to a resource in accordance with at least some embodiments.

FIG. 3 depicts a flow chart illustrating an example process for enabling biometric access to a resource in accordance with at least some embodiments. The process 300, or at least portions thereof, may be performed by an example service provider computer 106 as depicted in FIG. 2 and described above.

Process 300 may begin at 302, when enrollment data is received from a number of user devices. In some embodiments, the enrollment data may include a biometric template in obscured form (e.g., encrypted or in the form of an obfuscated circuit) as well as an indication of an account to be linked to embodiments of the disclosure. Upon receiving the enrollment data, the process may involve storing the enrollment data in association with both the account information and the user device from which the enrollment data was received at 304. In some embodiments, the enrollment data may replace existing enrollment data. For example, a user may wish to use a new biometric sample and/or associate the existing biometric template to a different account.

At 306, the process may involve monitoring and updating location information for each user device with which it is in communication. In some embodiments, the user device may have installed upon it a mobile application supported by the service provider computer 106. The mobile application may cause the user device to provide updated location information to the service provider computer. Location information may be provided to the service provider on a continuous or periodic basis. For example, the user device may provide updated location information to the service provider every 5 minutes.

Upon receiving a request from an access to device to access a resource using biometric information, the process may involve a subprocess 308. The received request may include a biometric template generated by the access device (e.g., an authentication template). In subprocess 308, the service provider may identify a current location of the access device from which the request was received. In some embodiments, the process may involve querying a location database to determine a known location of the access device. In some embodiments, the access device may provide a current location (e.g., within the request for access). For example, the access device may be a mobile point of sale (mPOS) implemented on a user device. In this example, the mPOS device may report its location to the service provider computer when providing the request for access.

At 310, subprocess 308 may involve identifying user devices within proximity of the access device. In some embodiments, this may involve using one or more region monitoring techniques (e.g., geofencing) to determine, based on updated location information for each user device, whether that user device is proximate to the requesting access device. In some embodiments, the subprocess 308 may also involve filtering out at least a portion of the candidate user devices identified as being proximate to the access device. This may involve the use of demographic or other data associated with the user. For example, if access to the resource is being requested by a female, then user devices that are associated with male biometric information may be filtered out. In another example, if access is being requested to a particular account maintained at an entity that operates the access device, then user devices which do not maintain an account at that entity may be filtered out. For example, if the access device is an ATM at a bank that can only be used to access funds in accounts maintained by that bank, then the service provider need not consider users that do not have an account at that bank.

At 312, subprocess 308 may involve comparing the biometric template received from the access device to biometric templates associated with each of the identified proximate user devices. In some embodiments, the subprocess 308 may determine, for each biometric template associated with a proximate user device, a likelihood that the user associated with the user device is the same user as is requesting access via the access device. In some embodiments, this likelihood may be expressed as a percentage or ratio. In some embodiments, the subprocess 308 may identify a user (or user device) associated with the highest likelihood of being the user requesting access to the resource via the access device. In some embodiments, this determination may be made only if the likelihood value is greater than a predetermined acceptable risk threshold value. In some embodiments, an acceptable risk threshold value may vary based on the access device from which the request has been received. For example, some access devices (or entities that operate those access devices) may be willing to take on a greater level of risk than other access devices. It should be noted that a higher acceptable risk threshold value will result in increased security at the cost of having a greater number of false declinations. Upon determining that the user requesting access to the resource via the access device is likely a particular user, the process 300 may involve identifying account information associated with that user (e.g., via the enrollment information).

In some embodiments, the comparing step 312 may include performing privacy preserving comparison protocol such as secure multi-party computation, homomorphic encryption, or fuzzy extractor techniques. Note, that such processes can be performed even through the enrollment templates stored in a database or memory are obscured (e.g, encrypted or in the form of an obfuscated circuit). For example, homomorphic encryption process is a form of encryption that involves a computation on ciphertexts, and generating an encrypted result which, when decrypted, matches the result of the operations as if they had been performed on the plaintext. This, two encrypted values may be computed to determine a match result, and the server computer (or another device may determine if a match occurred). Further details regarding the above-noted techniques can be found in PCT application number PCT/US17/24099, entitled AUTHENTICATION SYSTEM USING SECURE MULTI-PARTY COMPUTATION, filed on Mar. 24, 2017. PCT application number PCT/US16/58880, entitled WIRELESS BIOMETRIC AUTHENTICATION SYSTEM AND METHOD, filed on Oct. 26, 2016. Han, H., Otto, C., Liu, X., & Jain, A. K. (2015), which are herein incorporated by reference in their entirety for all purposes.

At 314, subprocess 308 may involve providing a response to the access device. In some embodiments, the response may include an indication as to whether the access device should approve or decline the transaction. The response may include account information which should be used to complete a transaction to grant the user access to the resource. For example, the process may return an account number from which the access device should debit an account in order to fund a cash withdrawal. The access device may then complete the transaction using the provided account information in any suitable manner. It should be noted that the access device may still be required to obtain authorization to complete the transaction from an authorization entity associated with the account. For example, once the access device has received verification that the user should be granted access as well as account information, the access device may still need to generate and send an authorization request message to an issuer of the account to determine if the user has sufficient funds to complete the transaction. Once the subprocess 308 has been completed, the process 300 may involve returning to step 306 and monitoring location data for user devices.

Although the above description provide account access as an illustration, it is understood that embodiments of the invention can be used to access any suitable resource including access to a secure location (e.g., building, transit station), access to secure data (e.g., access secure records), etc.

Figure 4:
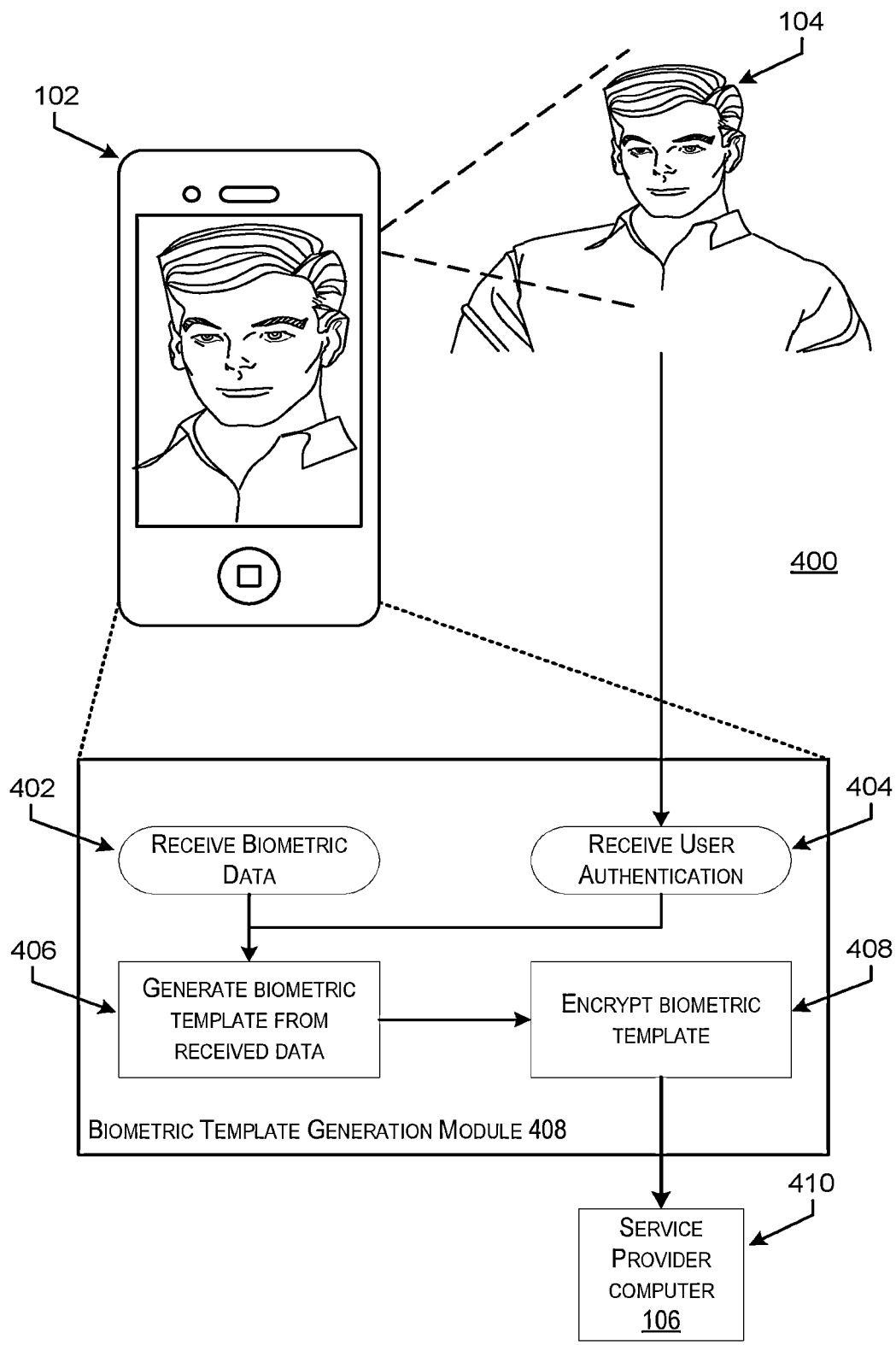
FIG. 4 depicts a flow chart illustrating an example process for enrolling a user for biometric access to a resource in accordance with at least some embodiments.

FIG. 4 depicts a flow chart illustrating an example process for enrolling a user for biometric access to a resource in accordance with at least some embodiments. The process 400, or at least portions thereof, may be performed by an example user device 102 as depicted in FIG. 2 and described above. In particular, the process 400 may be performed by a biometric template generation module 208, which may be an example of biometric template generation module 208 depicted in FIG. 2.

Process 400 may begin at 402, when a user device 102 receives biometric data associated with a user 104. For example, a camera device of the user device 102 may be used to collect a biometric sample associated with the user 104. In some embodiments, the biometric sample may be collected in response to a user 104 having requested enrollment into a system that enables biometric access to a resource. In some embodiments, the user may be required to authenticate that the user is who he or she claims to be at step 404. For example, the user may be required to log into an account maintained by a service provider computer 106. The account login may be performed via a mobile application installed upon, and executed from, the user device 102.

At 406, the process 400 may involve generating a biometric template from the received biometric data. In some embodiments, this may involve identifying various biometric features within the obtained biometric sample and identifying relationships between one or more of those features. An indication of those relationships may then be compiled into a biometric template. For example, the biometric template may include an indication as to a relative distance between various facial features of the user 104. In this example, the biometric template may store an indication of the distance between the user's mouth and the user's nose with respect to the distance between the user's nose and the user's forehead. In some embodiments, account information may be attached to the biometric template. For example, the user 104 may be asked to provide an indication of an account to be used in conjunction with the user's enrollment into the disclosed system.

In some embodiments, the process 400 may involve encrypting the generated biometric template. The user device 102 may, in response to requesting enrollment of a user 104, be provided with an encryption key. In some embodiments, the encryption key may be a device-specific encryption key which is associated with that user device 102. In some embodiments, the user device 102 may be provided with a public key (of a public-private key pair) associated with the service provider computer 106. In some embodiments, a shared secret key may be created for the user device and service provider computer using a combination of public-private key pairs (e.g., via a Diffie-Hellman key exchange). The biometric template may then be encrypted using the provided encryption key. In other embodiments, the biometric template may be formed into an obfuscated circuit.

Once the biometric template has been generated (and obscured), the biometric template may be provided to the service provider computer for enrollment of the user into the disclosed system. In some embodiments, the service provider computer may be an example of the service provider computer 106 of FIG. 1. The service provider computer may, upon receiving the biometric template, perform the process 300 described in relation to FIG. 3 above.

Figure 5:
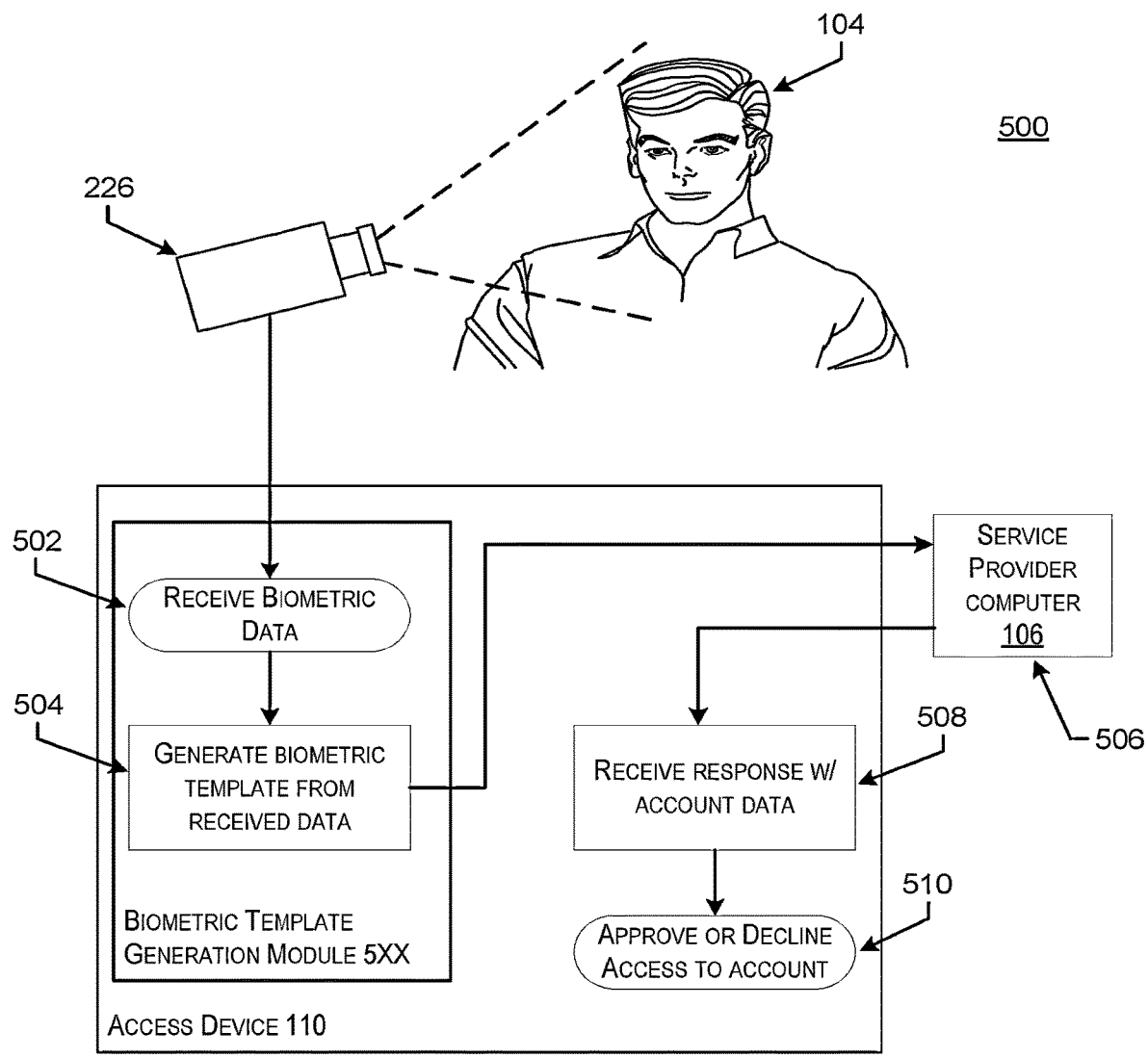
FIG. 5 depicts a flow chart illustrating an example process for managing access to a resource using biometric data in accordance with at least some embodiments.

FIG. 5 depicts a flow chart illustrating an example process for managing access to a resource using biometric data in accordance with at least some embodiments. The process 500, or at least portions thereof, may be performed by an example access device 110 as depicted in FIG. 2 and described above.

Process 500 may begin at 502, when a biometric sample is received at an access device 110. In some embodiments, the access device 110 may be an example of access device 110 depicted in FIG. 1. As depicted, the biometric sample related to a user 104 may be collected via a camera device 226. Camera device 226 may be an example of camera device 226 depicted in FIG. 2. In some embodiments, the biometric sample may be received in response to a user 104 submitting a request to the access device 110 to perform a transaction using biometric data.

At 504, the process 500 may involve generating a biometric template from the received biometric sample. This portion of the process 500 may be substantially similar to step 406 of process 400, in that the biometric template may be generated using the same techniques. The biometric template generated at 504 may be referred to as an authentication template. In some embodiments, the authentication template generated by the access device 110 may be encrypted. In some cases, this may involve the use of a device-specific encryption key (e.g., an encryption key unique to the access device 110 or an entity that operates the access device 110). In some cases, this may involve the use of a public key of a public-private key pair associated with the service provider computer. In some embodiments, the authentication template may be encrypted using data encryption keys as well as a PIN encipherment key associated with the access device 110.

Once the authentication template has been generated (and potentially encrypted), the authentication template may be provided to a service provider computer 106 at step 506. The service provider computer 106 may subsequently perform at least a portion of the process 300 described in relation to FIG. 3 above using the provided authentication template. The service provider computer 106 may then respond with an indication of an account as well as a likelihood that the user 104 is associated with the indicated account at 508. In some embodiments, the access device 110 may generate an encrypted biometric template from the received biometric sample at 504 and may compare that encrypted biometric template to one provided by the service provider computer 106. For example, upon receiving a request to conduct a transaction using biometric data, the access device 110 may convey the request to the service provider computer 106, which may subsequently provide encrypted biometric templates associated with each of the user devices determined to be proximate to the access device 110. The access device 110 may then perform a comparison between the encrypted biometric template that it generated and each of the encrypted biometric templates provided by the service provider computer 106 to identify a closest match. In these embodiments, it should be noted that the encrypted biometric templates need not be decrypted to make the comparison. For example, the encrypted biometric templates may have been encrypted using homomorphic encryption techniques, enabling the access device 110 to make a comparison between the encrypted biometric templates without decrypting those encrypted biometric templates. The resulting comparison will be inherently encrypted and can be decrypted using the same decryption key that could be used to decrypt each of the encrypted biometric templates. In these embodiments, the encrypted match result (which results from the comparison between two encrypted biometric templates) may be provided to, and decrypted and processed by, the service provider computer 106. The service provider computer 106 may then provide an indication as to a likelihood that the two encrypted biometric templates are a match. This process is described in greater detail in PCT application number PCT/US18/43656, entitled "SERVER-ASSISTED PRIVACY PROTECTING BIOMETRIC COMPARISON," filed on Jul. 25, 2018 which is herein incorporated by reference in its entirety.

In some embodiments, the access device 110 may determine whether to approve or decline the requested transaction based on the response received from the service provider computer 106. For example, upon receiving the account information and the indication as to the likelihood that the user 104 is the user associated with that account information, the access device may determine whether that likelihood value exceeds some predetermined risk value that represents a level of risk that an operator of the access device 110 is willing to bear. Upon receiving the account information and determining that the likelihood represents an acceptable level of risk, the access device 110 may initiate the transaction requested by the user 104 via any suitable means using the provided account information. For example, the access device 110 may generate an authorization message to be provided to an authorization entity of the account information, which may be routed over a transaction processing network. In this example, the access device may then grant access to the requested resource upon receiving an authorization response message indicating that the transaction is approved.

Figure 6:
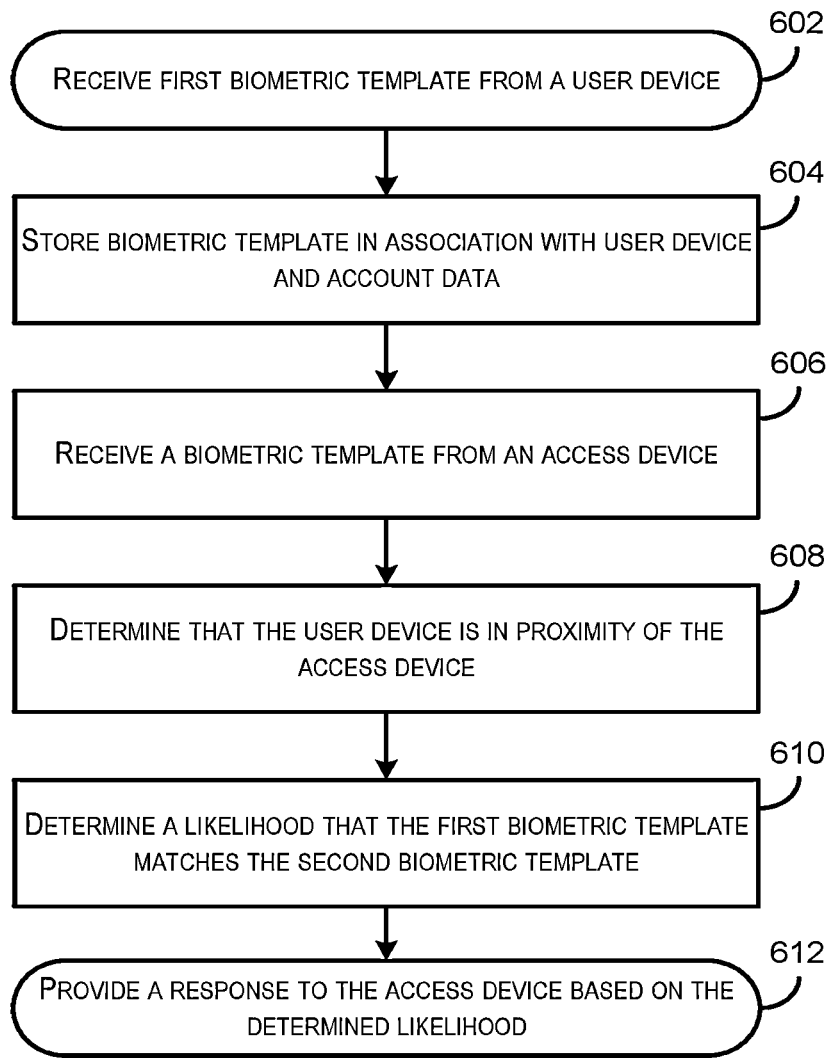
FIG. 6 depicts a flow diagram illustrating an example process for enabling biometric access to a resource in accordance with at least some embodiments.

FIG. 6 depicts a flow diagram illustrating an example process for enabling biometric access to a resource in accordance with at least some embodiments. The process 600, or at least portions thereof, may be performed by an example service provider computer 106 as depicted in FIG. 2 and described above.

In some embodiments, process 600 may begin at 602, when a first biometric template is received from a user device. The process for generating a biometric template from a biometric sample is described in greater detail elsewhere in this disclosure. In some embodiments, the first biometric template may be formed by encrypting a biometric template with a first cryptographic key. In some embodiments, the first encryption key may be an encryption key specific to the user device.

In some embodiments, process 600 may, at 604, involve storing the first biometric template (e.g., in encrypted form)

in association with the user device and/or account data. In some embodiments, the biometric template may be stored with an indication of a phone number or user device serial number which uniquely identifies the user device. The service provider computer may receive account information to store in association with the biometric template at the same time that it receives the biometric template. In some embodiments, a user may log into an account maintained at the service provider computer in order to separately provide account information to be linked to the biometric template. It should be noted that several features of the system described herein may be managed via logging into such an account. For example, in some embodiments, the user may provide an indication of an acceptable level of risk value that should be used in relation to his or her biometric templates.

In some embodiments, process 600 may, at 606, involve receiving a biometric template from an access device. The biometric template received from the access device (which may be referred to as an authentication template) may be received in relation to a request submitted by a user for access to a resource managed by the access device. For example, a user wishing to withdraw cash from an ATM (i.e., an access device) may approach the ATM and request the cash by indicating a preference to use biometric information. In this example, the ATM may capture an image (i.e., biometric sample) of the user and may generate a biometric template from that image, which the ATM may subsequently provide to the service provider. The biometric template may be encrypted.

In some embodiments, process 600 may, at 608, involve determining a number of user devices that are proximate to the access device from which the authentication template was received. In some embodiments, the process may involve first identifying (based on current location information for the devices) a first set of user devices within some region. For example, the set of user devices may be determined to include any user devices having a latitude between two bounding latitudes (within some distance of the latitude associated with the access device) and having a longitude between two bounding longitude (within some distance of the longitude associated with the access device). This would enable the system to quickly identify all user devices within some region surrounding the access device.

In some embodiments, process 600 may, at 610, involve comparing the authentication template to the biometric templates associated with each of the user devices determined to be proximate to the access device. For example, the process may involve comparing biometric features, or relationships between various biometric features, to determine whether they are a match. In some embodiments, the comparison may result in a percentage value to which the two biometric templates match. This percentage value may represent a likelihood that the user associated with each of the two biometric templates are the same user. In this way, the system may determine a likelihood value that the users associated with the biometric templates are the same user.

In some embodiments, the comparing step 312 may include performing privacy preserving comparison protocol such as secure multi-party computation, homomorphic encryption, or fuzzy extractor techniques. Note, that such processes can be performed without decrypting the enrollment templates if the enrollment templates are stored in a database. Further details regarding such techniques can be found in PCT application number PCT/US17/24099, entitled AUTHENTICATION SYSTEM USING SECURE MULTI-PARTY COMPUTATION, filed on Mar. 24, 2017. PCT application number PCT/US16/58880, entitled WIRELESS BIOMETRIC AUTHENTICATION SYSTEM AND METHOD, filed on Oct. 26, 2016. Han, H., Otto, C., Liu, X., & Jain, A. K. (2015), which are herein incorporated by reference in their entirety for all purposes.

In some embodiments, process 600 may, at 612, involve providing a response to the access device based on the determined likelihood value. In some embodiments, the response may include an indication to approve or decline a requested transaction based on whether the likelihood value exceeds an acceptable level of risk value. In some embodiments, the response may include the likelihood value, with which the access device can determine whether or not to complete the transaction. In some embodiments, the response may also include an account identifier that indicates an account to be used by the access device in granting access to a resource.

Embodiments of the invention provide for a number of technical advantages over conventional systems. For example, the system described herein is capable of enabling biometric access to an account maintained for a user without requiring any additional input from that user. In this example, the user is able to access his or her accounts without requiring that the user physically have a device associated with that account on his or her person, and without requiring that the user provide additional authentication. Conventional systems are not capable of performing this functionality. Further, embodiments of the invention can also allow for biometric enrollment templates to be stored in encrypted or otherwise obfuscated form in a database. Authentication templates can also be encrypted and privacy preserving comparison techniques can be used to compare an authentication template with enrollment templates. Further, since embodiments of the invention use location and other data (e.g., demographics) to reduce the number of potential enrollment templates with which to compare, embodiments of the invention provide for faster processing, more accurate and trusted authentication, and improved data security over conventional systems and methods.

Embodiments of the invention can include hands-free interaction systems and methods. Embodiments of the invention can be applied to an ATM (automatic teller machine), vending machine, or other access device (e.g., the access device 110 in FIG. 1). In embodiments of the invention, a customer of a bank (e.g., the user 104 in FIG. 1) that issues ATM cards enrolls on their user device (e.g., a phone) in a bank's mobile application ("application"). In this registration process, the customer provides their picture by taking one or more photographs of themselves ("selfies") using their user device (e.g., the user device 102 in FIGS. 1-2). The user device may be a mobile device (e.g., a mobile phone). The photographs are processed into one or more biometric templates by the mobile device, and stored on the mobile device. The one or more biometric templates may be referred to as enrollment templates (or first encrypted biometric templates). The mobile device may encrypt the template(s) and send them to a remote server computer (e.g., the service provider computer 106 in FIG. 1), and the remote server computer may store the first encrypted biometric template along with other first encrypted biometric templates of first biometric templates of other users. The encryption can be done with a cryptographic key known only to the customer's mobile device. One advantage of this approach is that the one or more enrollment templates do not need to be decrypted for biometric matching to be carried out.

The customer can also opt in to reporting their geo-location of their mobile device, even when they are not using their app. They are also encouraged to enable Wi-Fi on their device, to enable a more accurate location determination. Optionally, the mobile device can also report some demographic data to the remote server computer, such as age and gender. This will help optimize the operational load on the remote server computer. This will also help narrow down the number of candidate first biometric templates (out of those that are proximate to the access device) in order to improve the efficiency and accuracy of biometric identification on the server. Additional details regarding the use of demographics in biometric matching methods and systems can be found in U.S. provisional application No. 62/559,406, filed on Sep. 15, 2017, which is herein incorporated by reference in its entirety for all purposes.

When the customer gets within a certain range of one of a bank's ATMs, their location will be reported to the remote server computer, and the remote server computer can detect the location of the mobile device. The remote server computer can store a list of devices that are proximate at that given time, for each of the bank's ATM, such that at any given time the server computer will have information about each of the ATMs, and which mobile devices are proximate to that ATM. When some time has passed, a mobile device that is no longer reporting that it is close to a particular ATM will be removed from the list, such that the list only contains mobile devices that are likely to be in proximity to the ATM.

The geolocation determination may be performed using various means, including proximity to mobile base stations, Wi-Fi stations, GPS, and/or other more accurate technologies using micro geo-fencing that may employ a compass, an accelerometer, etc. In order to preserve battery life, the general locations of the bank's ATMs can be cached on the customer's device, at least for the local area where the device is located. In this way, the mobile device can know when to report its location to the server computer, and will not have to do this on a continuous basis.

When the customer is in front of the ATM, there is an option on the welcome screen asking if the customer wants to obtain cash by allowing the ATM to take a picture of the customer's face (i.e., a "Cash with Face" program). If the customer (1) says YES, (2) happens to be enrolled, and (3) have their mobile device switched on, the ATM display can display a prompt for the customer to have their photo taken by the ATM. The customer can be guided on how to position their face and a photo will be captured, from which a facial template can be derived. This template can be referred to as the authentication template, or the second encrypted biometric template.

The authentication template can be encrypted (the second encrypted biometric template) by the ATM, possibly using data encryption keys derived alongside the ATM's PIN encipherment keys, and sent to the remote server computer. The remote server computer can receive the authentication template and decrypt the authentication template and perform a privacy-preserving comparison between that template and the enciphered enrollment templates (first encrypted biometric templates of the user and other users) from each of the consumer devices that are on the server's list of devices that are proximate to that ATM. This can be used to determine, which of the first biometric templates (if any) stored in the remote server computer matches the second biometric template. This privacy preserving comparison can be carried out using for example, secure multiparty computation, homomorphic encryption, or fuzzy extractor techniques. Note, that this can be performed without decrypting the enrollment templates. This can be done to identify which customer is standing in front of the ATM. Also, if a customer's mobile device has reported any demographic characteristics for its owner, the ATM can derive demographic characteristics from the photo it captured, and the server computer only needs to compare first biometric templates that share the demographic characteristics from the captured photo. For example, if a woman in her thirties is standing in front of the ATM, the server does not need to query devices that have clearly different demographic profile of their owner.

If exactly one of the comparisons yield a match, it is likely that the customer owning the mobile device with the matching enrollment template is indeed the person standing in front of the ATM. At this point, the bank may use its discretion, possibly based on the transaction amount desired or other risk factors, to complete the transaction by prompting for the customer's consent, dispensing the desired cash while debiting the identified customer's account. Alternatively, an additional check can be carried out, where the ATM prompts the customer for their PIN or other identifying information, and validates this information as a normal PIN transaction.

The message that is generated and transmitted from the remote server computer to the ATM may be a message indicative of a match if a match is determined. The message indicative of a match may be a message that instructs the ATM to provide the cash that was requested by the user. In other embodiments, the message indicative of a match may simply be an indication of a match. Logic or programming in the ATM may dispense the cash upon certain other conditions (e.g., the entry of a valid PIN) if desired.

For security, the matching threshold can be set fairly high, resulting in a relatively high false reject rate. This can then be compensated for by allowing for several tries where the customer is guided to provide a good quality photo.

If more than one comparison matches, the customer can be asked to re-take the photo, or to provide a PIN, to ensure that the correct customer is debited.

An alternative flow is possible if the remote server computer can communicate with the bank's application on the customer's device while the customer is at the ATM. In this case, the remote server computer can establish a session key with the customer's application, and communicate the encrypted authentication template back to the customer's application, so that the application can perform a biometric match between the authentication template and its enrollment template, for extra assurance that this is the correct customer.

In some embodiments, the first biometric template (enrollment template) can expire after one or more transactions have occurred (one-time or limited use). At the end of the transaction flow, the remote server computer can request and receive a new encrypted enrollment template from the customer's device.

Further details and descriptions of biometric processing can be found in the following documents, which are herein incorporated by reference in their entirety for all purposes: PCT application number PCT/US17/24099, entitled AUTHENTICATION SYSTEM USING SECURE MULTI-PARTY COMPUTATION, filed on Mar. 24, 2017. PCT application number PCT/US16/58880, entitled WIRELESS BIOMETRIC AUTHENTICATION SYSTEM AND METHOD, filed on Oct. 26, 2016. Han, H., Otto, C., Liu, X., & Jain, A. K. (2015). Demographic estimation from face images: Human vs. machine performance. IEEE transactions on pattern analysis and machine intelligence, 37(6), 1148-1161. Wang, X., Guo, R., & Kambhamettu, C. (2015, January). Deeply-learned feature for age estimation. In Applications of Computer Vision (WACV), 2015 IEEE Winter Conference on (pp. 534-541). IEEE. Lagree, S., & Bowyer, K. W. (2011, November). Predicting ethnicity and gender from iris texture. In Technologies for Homeland Security (HST), 2011 IEEE International Conference on (pp. 440-445). IEEE. Thomas, V., Chawla, N. V., Bowyer, K. W., & Flynn, P. J. (2007, September). Learning to predict gender from iris images. In Biometrics: Theory, Applications, and Systems, 2007. BTAS 2007. First IEEE International Conference on (pp. 1-5). IEEE.

Throughout this application, facial recognition has been used as an example, but any other biometric modality (e.g., fingerprint, retina scans, etc.) that can be captured both on a consumer device and at an ATM would also be possible. Also, although a use case with an ATM is described in detail, it is understood that the method may be used if the access device a vending machine, merchant point of sale terminal, etc. Also, although a facial biometric template is described in detail, the biometric may be other types of biometrics in other embodiments (e.g., a fingerprint, voiceprint, retinal scan, etc.).

In additional embodiments, a user may "pre-order" a resource such as cash from an access device such as an ATM machine. In such embodiments, a user may use his mobile device to specify the amount of cash that the user wishes to withdraw, without being in front of the ATM. When the user approaches the ATM, the user may provide an image of his or her face and may receive the requested cash. In this embodiment, the user may not need to provide any data input into the ATM machine.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
   receiving, by an access device from a user device, a first biometric sample of a user operating the user device, for conducting an interaction;
   generating, by the access device, first biometric information in an obscured format, based on the first biometric sample;
   transmitting, by the access device to a service provider computer, a request for biometric information associated with a plurality of users whose biometric information was respectively obtained from corresponding biometric samples of the plurality of users and stored in a database by the service provider computer prior to the receiving the first biometric sample;
   in response to the request, receiving, by the access device from the service provider computer, a first plurality of biometric information in an obscured format, wherein the first plurality of biometric information respectively corresponds to a first plurality of users operating a first plurality of user devices, which are determined to be within a predetermined distance of the access device based on the request, among a plurality of user devices associated with the plurality of users, wherein the first plurality of biometric information is a subset of the biometric information associated with the plurality of users;
   comparing, by the access device, the first biometric information in the obscured format to the first plurality of biometric information in the obscured format;
   generating, by the access device, a match result based on the comparing;
   providing, by the access device to a server computer, the match result; and
   in response to the match result being provided, receiving, by the access device, information indicating that one of the first plurality of users that is associated with one of the first plurality of biometric information is the user associated with the first biometric information.

2. The method of claim 1, wherein:
   the comparing further comprises performing a privacy preserving comparison process between the first biometric information and the first plurality of biometric information, and
   the privacy preserving comparison process utilizes at least one from among secure multi-party computation (SMPC), fuzzy logic, and homomorphic encryption.

3. The method of claim 1, further comprising providing a message indicative of the match result, the message comprising a command for instructing the access device to dispense a resource.

4. The method of claim 1, wherein the comparing further comprises comparing the first biometric information to the first plurality of biometric information without decrypting the first biometric information and the first plurality of biometric information.

5. The method of claim 1,
wherein the biometric information associated with the plurality of users is obtained from the corresponding biometric samples respectively provided by the plurality of users during an enrollment process; and
wherein the biometric information is stored in the obscured format.

6. The method of claim 1, wherein the first biometric information is an obfuscated circuit.

7. The method of claim 1, wherein the first biometric information is formed using a cryptographic key.

8. The method of claim 5, wherein the biometric information is stored in correspondence with an account information of the plurality of users, respectively.

9. The method of claim 8, further comprising:
receiving a message comprising the account information of the user that is used by the access device to complete the interaction.

10. An access device comprising:
at least one processor; and
a non-transitory computer-readable storage medium comprising code which, when executed by the at least one processor, causes the at least one processor to perform a method including:
receiving, from a user device, a first biometric sample of a user operating the user device, for conducting an interaction;
generating first biometric information in an obscured format, based on the first biometric sample;
transmitting, by the access device to a service provider computer, a request for biometric information associated with a plurality of users whose biometric information was respectively obtained from corresponding biometric samples of the plurality of users and stored in a database by the service provider computer prior to the receiving the first biometric sample;
in response to the request, receiving, by the access device from the service provider computer, a first plurality of biometric information in an obscured format, wherein the first plurality of biometric information respectively corresponds to a first plurality of users operating a first plurality of user devices, which are determined to be within a predetermined distance of the access device based on the request, among a plurality of user devices associated with the plurality of users, wherein the first plurality of biometric information is a subset of the biometric information associated with the plurality of users;
comparing the first biometric information in the obscured format to the first plurality of biometric information in the obscured format;
generating a match result based on the comparing;
providing, to a server computer, the match result; and
in response to the match result being provided, receiving information indicating that one of the first plurality of users that is associated with one of the first plurality of biometric information is the user associated with the first biometric information.

11. The access device of claim 10, wherein the first biometric information is generated in response to a request to access a resource managed by the access device.

12. The access device of claim 10, wherein the receiving the information further includes receiving a message indicative of the match result that includes a likelihood value.

13. The access device of claim 12, wherein the likelihood value comprises a percentage.

14. The access device of claim 12, wherein the method further includes determining whether to complete the interaction based on the likelihood value.

15. The access device of claim 14, wherein the determining whether to complete the interaction further includes:
determining to complete the interaction if the likelihood value is greater than an acceptable level of a risk threshold.

16. The access device of claim 15, wherein the acceptable level of the risk threshold is selected by the user.

17. The access device of claim 15, wherein the acceptable level of the risk threshold is specific to the access device.

18. The access device of claim 10, wherein the
biometric information associated with the plurality of users is obtained from the corresponding biometric samples respectively provided by the plurality of users during an enrollment process,
wherein the biometric information is in the obscured format, and
wherein the comparing further includes comparing the first biometric information to the first plurality of biometric information without decrypting the first biometric information and the first plurality of biometric information.

* * * * *